(No Model.)

H. McCOY.
SINGLE AND DOUBLE TREE CLIP.

No. 246,404.  Patented Aug. 30, 1881.

WITNESSES:

INVENTOR:
Hamilton McCoy,

UNITED STATES PATENT OFFICE.

HAMILTON McCOY, OF INDIANAPOLIS, INDIANA.

SINGLE AND DOUBLE TREE CLIP.

SPECIFICATION forming part of Letters Patent No. 246,404, dated August 30, 1881.

Application filed June 7, 1881. (No model.)

*To all whom it may concern:*

Be it known that I, HAMILTON McCOY, a citizen of the United States, residing at Indianapolis, in the county of Marion and State of Indiana, have invented a new and useful Improvement in Single and Double Tree Clips, of which the following is a specification.

My invention relates to improvements in clips for single and double trees, in which each end of the band is formed into a partial ring, which, when closed together and bolted on the single-tree or double-tree, forms a perfect locked ring; and the object of my invention is to provide a split-ring lock-clip for single and double trees. This object I accomplish by the device illustrated in the accompanying drawings, in which—

Figure 1:
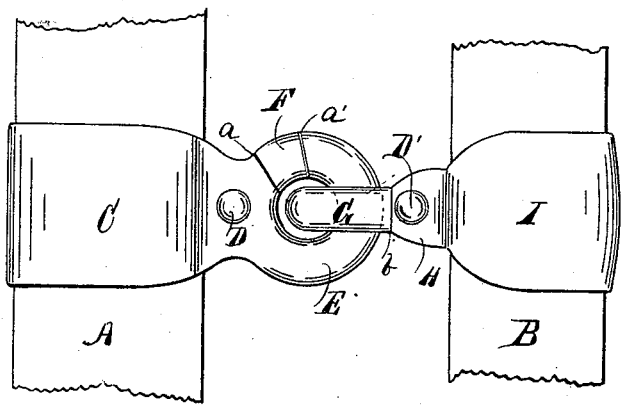
Figure 2:
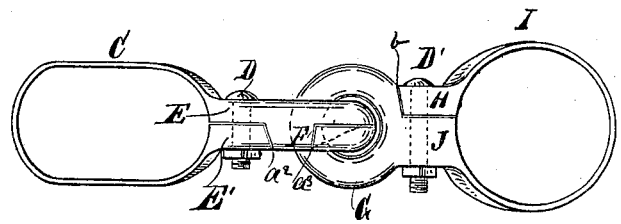

Figure 1 represents a plan view of two of my improved clips locked together, and Fig. 2 is a side view of the same.

Similar letters refer to like parts in the two views.

A represents a double-tree, and B a single-tree. The clip on the double-tree A consists of the band C, which encircles the wood of the double-tree. The end E of the clip forms nearly a full horizontal ring, with a space between the lines $a\,a'$ wide enough to admit the ring G of the clip I. The ring E is a half-ring vertically, except the part F', Fig. 2, which is a full section of the ring, adapted to fit between te ends $a^2\,a^3$ of the lower ring, E', and form a lock in the same manner as the part F on the lower ring, E', filling the space between the lines $a\,a'$, Fig. 1. The end E' of the clip forms a corresponding half-ring with full section F, as shown.

When it is desired to attach the clip to a single-tree the bolt D is rounded and the parts E E' sprung apart. The band C is then slipped on the tree to its proper place, and the clip made fast by bolting the parts E E' together by the bolt D. As the two half-rings E E' come together the part F of the ring E' and the part F' of the ring E enter their respective recesses or notches and form a lock to the rings. Any ordinary hook-clip may now be hooked into the eye formed of the parts E E'; or if a solid ring is to be inserted, such—for instance, as the solid ring G on the clip I—then the bolt D is rounded, the parts E E' are spread apart, and the ring G inserted in the space between the lines $a\,a'$. The ring is then moved around to the opening between the lines $a^2\,a^3$ of the lower ring, E', and passed through the parts E E', and then closed and bolted together, with the ring G in the ring E E', as shown.

The clip I, with its solid eye or ring illustrated in this case, will not be broadly claimed here, because it is the subject-matter of a separate application of even date herewith for Letters Patent.

I am aware that prior to my invention split rings have been used to form clips, and to such devices I make no claim, broadly; but What I do claim as new, and desire to secure by Letters Patent, is—

A clip for single and double trees, consisting of the band C, having at one end the split ring E, with opening on one side between the lines $a\,a'$ to receive the part F of the lower ring, and part F' to fit into the space formed between the lines $a^2\,a^3$ of the lower ring, said clip having on its other end the split ring E', with part F to fit the space between the lines $a^2\,a^3$ to receive the part F' of the ring E, combined with the bolt D, substantially as shown and described.

In testimony whereof I have signed my name to this specification in the presence of two subscribing witnesses.

HAMILTON McCOY.

Witnesses:
G. H. RENNETT,
E. O. FRINK.